United States Patent [19]

Schrock

[11] 4,291,905

[45] Sep. 29, 1981

[54] DUCT SEAL

[75] Inventor: Jesse C. E. Schrock, Seattle, Wash.

[73] Assignee: The Boeing Company, Seattle, Wash.

[21] Appl. No.: 972,535

[22] Filed: Dec. 22, 1978

[51] Int. Cl.³ .............................................. F16L 41/00
[52] U.S. Cl. ..................................... 285/192; 248/56; 285/224; 285/DIG. 1
[58] Field of Search ............... 285/192, 224, 223, 158, 285/13, DIG. 1; 248/56, DIG. 1

[56] References Cited

U.S. PATENT DOCUMENTS

| | | | |
|---|---|---|---|
| 1,802,353 | 4/1931 | Rousek et al. | 285/158 X |
| 2,404,539 | 7/1946 | Schmidt | 285/192 X |
| 2,410,999 | 11/1946 | Reisner | 285/192 X |
| 2,574,142 | 11/1951 | Buongirno | 285/192 X |
| 2,813,692 | 11/1957 | Bremer et al. | 248/56 |
| 2,992,023 | 7/1961 | Yantis | 285/192 X |
| 4,052,089 | 10/1977 | Weaver | 285/224 X |
| 4,068,854 | 1/1978 | Douglass, Jr. | 285/192 X |
| 4,184,689 | 1/1980 | Brodell et al. | 285/224 X |

FOREIGN PATENT DOCUMENTS 624841 6/1949 United Kingdom ................ 285/272
428153 2/1975 U.S.S.R. .............................. 285/224

OTHER PUBLICATIONS

Bestobell Aviation Products Limited, Data Sheet BAS 183, Slough, Bucks, England, May 1972.

Primary Examiner—Thomas F. Callaghan
Attorney, Agent, or Firm—David G. Pursel; Ronald E. Suter; Bernard A. Donahue

[57] ABSTRACT

A duct seal including a supporting assembly adapted to support a duct extending through an opening in a partition and a mounting assembly mountable by the partition for guiding and retaining the supporting assembly. The seal maintains a seal against overpressure while permitting the duct to shift bi-directionally lengthwise and about its axis rotatively and orbitally. The seal is particularly useful as an aircraft firewall duct seal.

10 Claims, 5 Drawing Figures

DUCT SEAL

The Government has rights in this invention pursuant to Contract No. F33657-76-C-0740 awarded by the Department of the Air Force.

BACKGROUND OF THE INVENTION

This invention relates to pressure sealing devices which are adapted to support an elongated member, or duct, passing through an opening in a partition. While the invention is described herein in relation to its use for protecting the compartment on one side of an aircraft firewall from the transient pressure surges which may occur on the other side of the firewall, it will be readily apparent that the invention may also be used in other applications and environments.

In some jet aircraft, hot air is bled off from the jet engine and is transported by bleed air ducts to other areas of the aircraft for use in the aircraft pneumatic system. The jet engine core is surrounded by a protective firewall which separates it from the nacelle fan duct. The bleed air ducts extend from the jet engine core, pass through the firewall and continue on along the nacelle fan duct into the fuselage. Because space between the firewall and the jet engine is subject to extreme pressures and high temperatures, the firewall is designed to withstand these temperatures and pressures without loss of strength or change in shape. If an unusually high pressure is developed in the region between the engine and the firewall as a result of an engine backfire, for example, the overpressure is relieved by a blow out panel which opens to act as an overpressure fuse by discharging hot gases into the exhaust stream of the engine.

A firewall duct seal is located at the point where each bleed air duct passes from the engine or inner side of the firewall to the outer side to prevent the passage of hot gases and flames from the engine to other parts of the aircraft under normal operating conditions. The duct seal desirably must be able to withstand the temperatures and overpressures to which it is exposed during normal operation of the associated jet engine or engines. Furthermore, the seal must permit the duct to shift because of thermal and vibrational effects.

One aircraft firewall duct seal includes two woven asbestos sheets and a peripheral circular metal spring which is sewn between the sheets. A circular hole is cut from the center of the asbestos sheets inside the area surrounded by the metal spring. The bleed air duct is passed through the hole and the seal is mounted to the firewall over the opening in the firewall. The metal spring encircles the duct and presses the asbestos material against it to effect a seal.

This seal is unsatisfactory in most practical aircraft applications. The spring tends to pinch the asbestos material against the duct, and, in combination with the movement of the duct with respect to the firewall, the asbestos sheets often become chafed. As a consequence, the spring comes in contact with the duct as the asbestos material is worn away. This continued usage causes gouging and abrasive wear of the duct. Most importantly, the integrity of the firewall is eliminated, and there is no seal left to prevent the escape of hot gases through the opening in the firewall. A critical disadvantage of the asbestos seal is its inability to confine overpressure transients to the engine side of the firewall. Additionally, this seal tends to rupture when there is an overpressure or explosion, such as a backfire, on the engine side of the firewall. When ruptured, high temperature engine gases can escape into the fan duct, with concomitant melting and fire damage to the duct. Consequently, the asbestos seal affords unsatisfactory protection from flames and hot gases for the compartment on the outer side of the firewall.

Therefore, it is an object of the invention to provide a rigid partition sealing apparatus which will permit an elongated member to pass through an opening in the partition and maintain the integrity of the partition by preventing flame and hot gases from passing through the opening.

Another object of the invention is to provide an apparatus which will protect an elongated member passing through an opening in a partition from scratches and abrasive wear resulting from movement of the member with respect to the partition.

Another overpressure seal includes a metal collar that is welded to the pipe or duct where it passes through the firewall. However, this seal has the disadvantage of interfering with the installation of the duct through the firewall. Additionally, this seal is unsatisfactory in most practical applications in which the duct is subjected to longitudinal forces or thermally induced length variations because the collar, being welded to the duct, will not allow lengthwise shifting of the duct with respect to the partition once the seal is fixed in position.

Thus, it is another object of the invention to provide a duct seal apparatus that can be easily installed.

A related object to that just stated is to provide a duct seal apparatus which may be readily installed, or removed and reinstalled, solely from one side of the partition, if so desired, where workspace is available on one side of the partition only.

Still another object is to provide a duct seal apparatus for supporting an elongated member where it passes through a partition while allowing lengthwise shifting of the member with respect to the partition.

It is a further object of the invention to provide a duct seal apparatus for supporting an elongated member passing through a partition which will permit shifting of the member with respect to the partition, both orbitally and rotatively.

The term "orbital" as used herein refers to movement of the elongated member such that a point on the the longitudinal axis thereof travels along a path essentially parallel to the face of the partition. It will be recognized that orbital movement of the member could be accompanied by rotative movement thereof with respect to its longitudinal axis and/or lengthwise movement thereof with respect to the partition, as the case may be.

SUMMARY OF THE INVENTION

This invention accomplishes these and other objectives by providing a pressure sealing apparatus which maintains the integrity of a partition, such as an aircraft firewall, through which an elongated member, or duct, must pass and allows the duct bi-directional freedom of movement lengthwise, as well as rotatively and orbitally with respect to the longitudinal axis thereof.

According to one preferred embodiment of the invention, the seal includes a supporting assembly and a mounting assembly. The supporting assembly includes one and, preferably, a pair of sleeves which are expandable radially to enable them to slide over the end of the duct and yet surround and conform snugly to the exterior surface of the duct at a location between the ends thereof. The sleeves grip the duct with contact pressure sufficient to prevent an overpressure transient from passing between the sleeves and the duct and yet loosely enough so that the duct is movable in both directions along its axis with respect to the sleeve. Each sleeve has a large flange at one end of a tubular portion, a small lip at the other end and a single slot or gap extending the length thereof. The sleeves are positioned end-to-end on the duct with their large flanges abutting one another. In order to minimize pressure transference from one side of the firewall to the other, the sleeves are arranged and fastened together so that their respective gaps are not aligned. As so arranged, the pair of sleeves are positioned along the length of the duct at the point where the duct is to pass through the opening in the firewall.

With the sleeve pair positioned as described above, the duct is installed through an opening provided in the firewall. The supporting assembly through which the duct passes is mounted to the firewall by the mounting assembly. The mounting assembly includes a filler plate upon which is disposed a capture plate. The capture plate is positioned so that it overlaps the abutting sleeve flanges and movably secures the flanges in place with both flanges adjacent to one face of the firewall and the tubular portion of one sleeve projecting through the firewall opening. The large flange of one sleeve is maintained in engagement with one face of the firewall and overlaps the firewall opening to provide a seal which will prevent flames from passing from one side of the firewall to the other. As so described, the overlapping relationship between the flanges and the opening in the firewall and the overlapping relationship between the capture plate and the flanges are sufficient to protect the region on the outside of the firewall from flame passage and transient overpressure events, such as engine backfires, occurring on the engine side. The capture plate secured the sleeves such that they can shift rotatively or orbitally with the duct with respect to the partition, but retains them against movement in a direction perpendicular to the partition. In this instance, the aforementioned sleeve construction allows the duct to shift lengthwise with respect to and within the sleeves when they are so retained.

As will now be appreciated, the duct seal permits some gas transference between opposite sides of the partition so that steady-state pressure differentials on opposite sides of the partition will progress toward a pressure equilibrium. When the pressure differential across the partition is a transient overpressure event, however, the sleeves are so constructed that they will prevent an instantaneous pressure equalization. It will be apparent from the foregoing that the duct seal acts as an overpressure seal which permits only an insubstantial quantity of gas to pass from one side of the partition to the other when a transient overpressure event occurs.

These and other features, objects, and advantages of the invention will become apparent from the detailed description and claims to follow, when taken in conjunction with the accompanying drawings wherein like reference numerals indicate like parts throughout the several views.

DETAILED DESCRIPTION OF THE DRAWINGS

Figure 1:
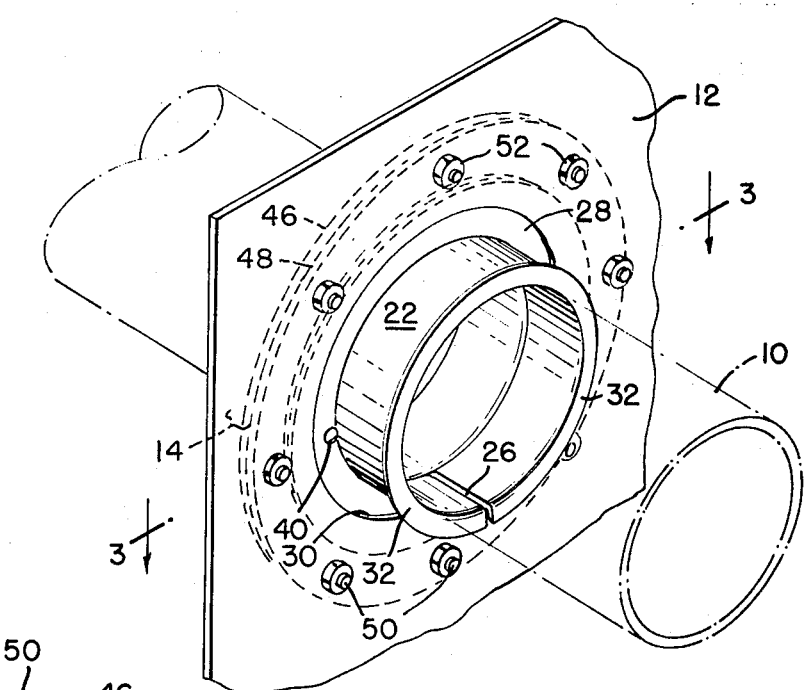
FIG. 1 is a perspective view of a firewall duct seal according to this invention, depicting the installed duct and the firewall.
Figure 2:
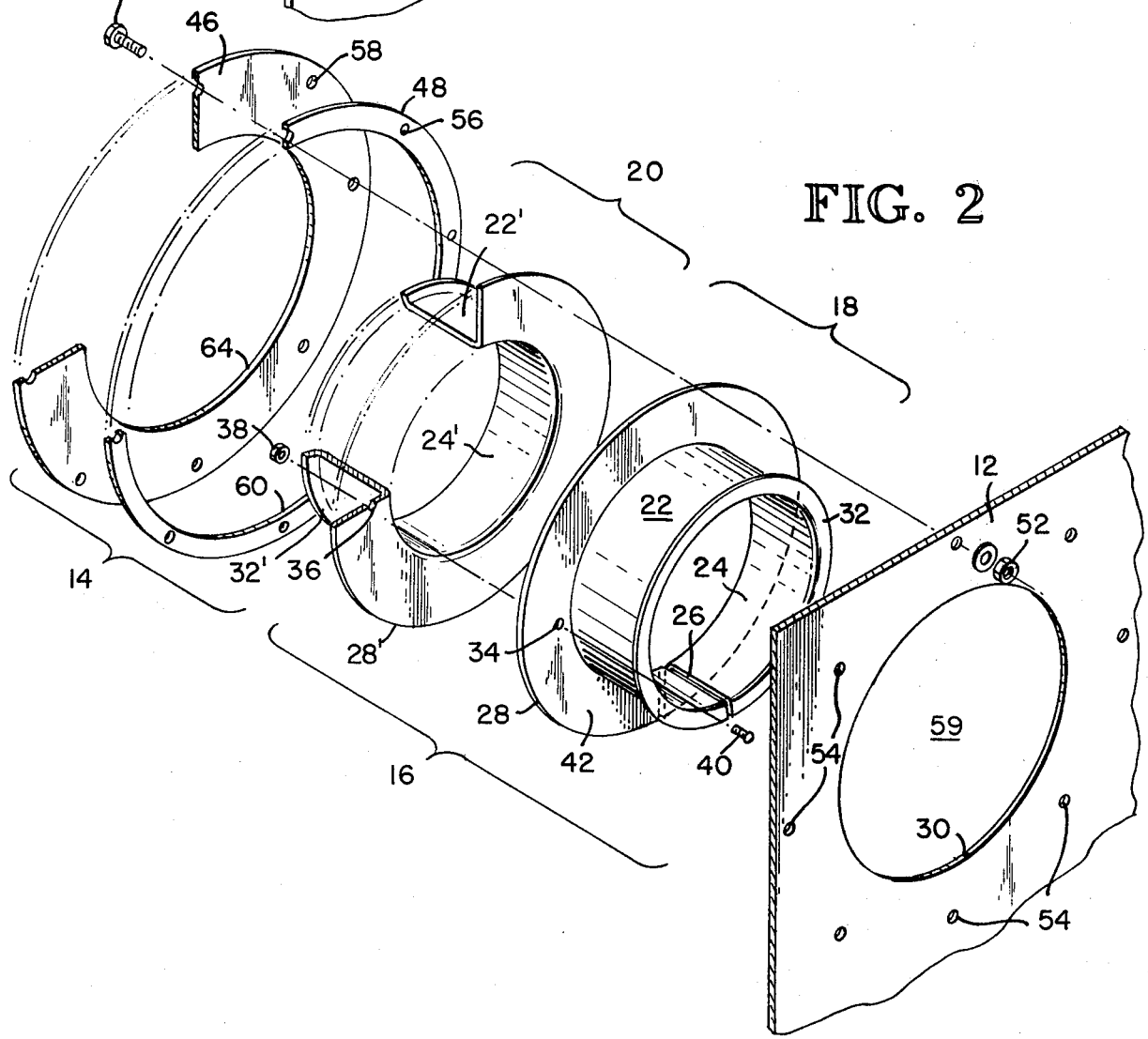
FIG. 2 is an exploded perspective view of the FIG. 1 duct seal.

Referring to FIGS. 1 and 2 of the drawings, the apparatus is shown assembled in one preferred embodiment. Duct 10 is shown passing through partition 12 and being held in position by a supporting assembly (generally referenced 16 in FIG. 2), which will be described in detail hereinafter. The mounting assembly (generally referenced in FIG. 1 by numeral 14) is made up of two annular plates, capture plate 46 and filler plate 48. Mounting assembly 14 retains supporting assembly and duct 10 in place within the edge of opening 30 in partition 12. FIG. 2 is an exploded view of the seal showing the overlapping relationship between mounting assembly 14 and supporting assembly 16. Supporting assembly 16 includes two sleeves, 18 and 20. Sleeve 18 is substantially identical and interchangeable with sleeve 20. For ease of description, only sleeve 18 will be described in detail. It is to be understood, however, that the description of sleeve 18 is applicable to sleeve 20 and like parts of sleeve 20 are designated by the same reference numerals, primed.

Figure 4:
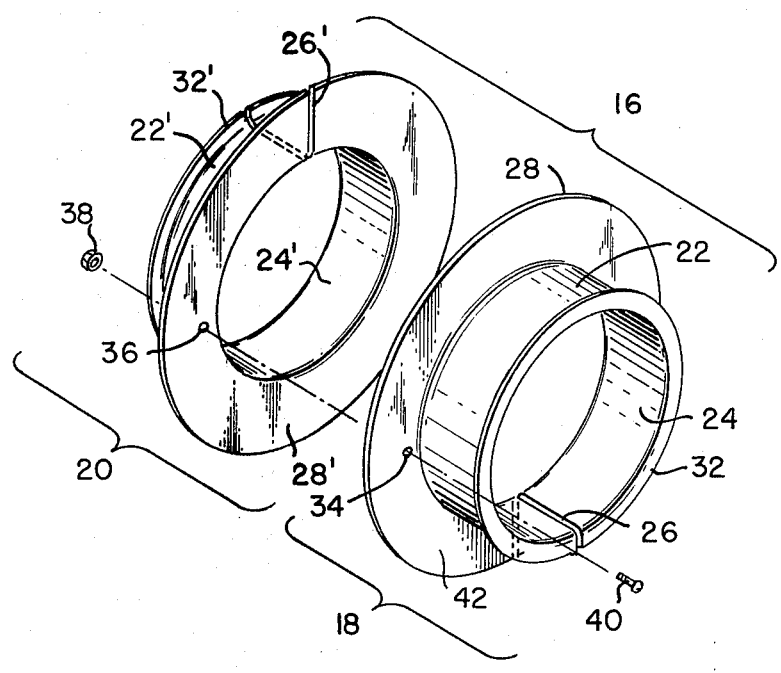
FIG. 4 is a perspective view of the supporting assembly of the FIG. 1 duct seal.

With reference to FIG. 4, sleeve 18 includes tubular portion 22, which substantially surrounds the elongated member or duct 10 shown in FIG. 1, and provides support for the duct at the point where it passes through partition 12. The interior surface 24 of sleeve 18 has an outline substantially conformable to the external contour of duct 10, as shown in FIG. 1. Sleeve 18 is provided with gap 26 extending axially along the length of one side which allows the sleeve assembly to expand sufficiently to be easily slid over the duct and moved to the desired position along the duct. Additionally, sleeve 18 is expandable and contractable radially in response to the thermal expansion or contraction of duct 10 cross-sectionally. Sleeve 18 fits snugly against the exterior surface of duct 10 and exerts contact pressure between the sleeve and the duct sufficient to maintain an overpressure seal between the sleeve and the duct and yet permit the duct to move bi-directionally along its length with respect to the sleeve when the sleeves are retained in their illustrated positions by the mounting assembly.

Figure 3:
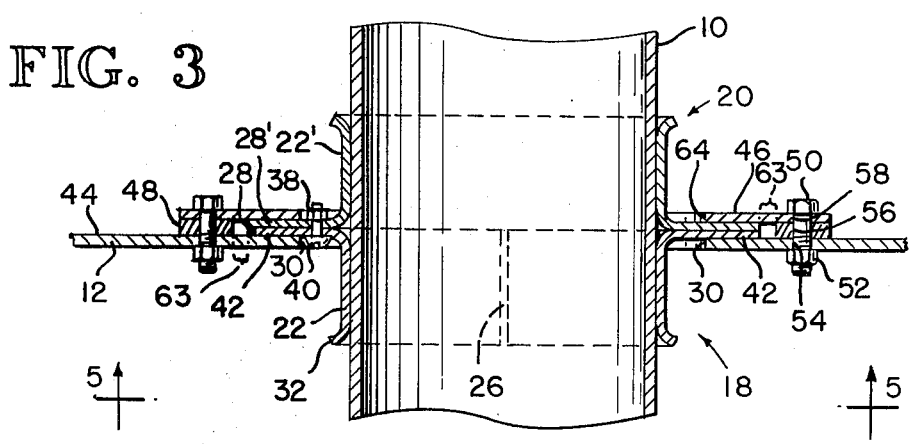
FIG. 3 is a sectional view taken along line 3—3 of FIG. 1.

Still referring to FIG. 3, inner flange 28 projects transversely from the inner end of portion 22. When the parts have been assembled as shown in FIG. 3, flange 28 is disposed adjacent to outer face 44 of partition 12 in an overlapping relationship with edge 30 of opening 59. Referring to FIG. 4, portion 22 terminates at its outer end in lip 32, which is flared outwardly to provide a smooth surface on the end of the sleeve member so that the duct will not be scratched or excessively worn as it moves longitudinally within the sleeves.

Sleeves 18 and 20 include holes 34 and 36, respectively, for fastening the sleeves together such that gaps 26 and 26' therein are prevented from aligning. Alignment nut 38 lies in registry with holes 34 and 36 and serves to receive alignment bolt 40 when the latter is passed through holes 34 and 36. By preventing alignment of the gaps, pressure communication via the gaps is blocked, and the overpressure seal is readily maintained.

Referring now to FIG. 3, the duct seal is shown installed in partition 12, wherein the supporting assembly is retained movably in position surrounding duct 10, which is extending transversely through the opening in partition 12. The supporting assembly illustrated comprises sleeve 18 positioned in end-to-end relationship with sleeve 20 so that flanges 28 and 28' abut one another face-to-face. Tubular portion 22 extends through the opening in partition 12 with surface 42 of flange 28 in face-to-face engagement with interior face 44 of partition 12 and overlapping edge 30 therein to establish an overpressure seal.

Referring to FIG. 2, mounting assembly 14 includes capture plate 46, filler plate 48, securing bolts 50 and securing nuts 52. Securing apertures 54, which are formed in partition 12, lie in registry with securing apertures 56 in the filler plate and serve to receive mounting bolts 50 when these bolts are passed through apertures 58 in the capture plate.

Figure 5:
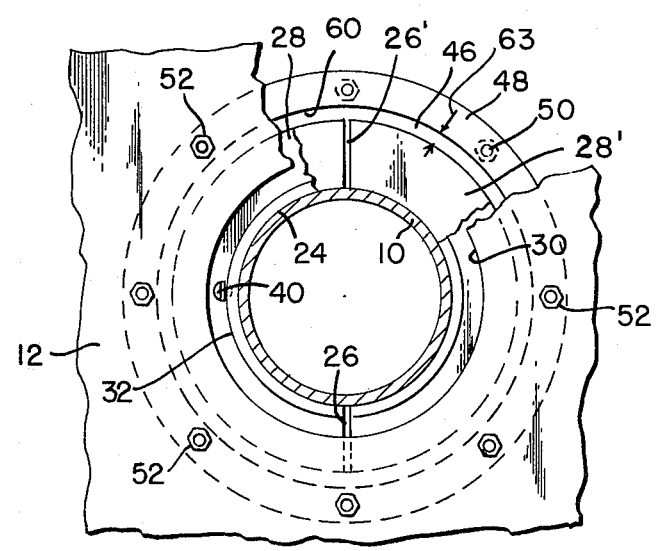
FIG. 5 is a section taken along line 5—5 of FIG. 3, with parts broken away.

Referring again to FIG. 2, filler plate 48 is positioned adjacent to interior face 44 and encircles opening 59. When the parts have been assembled, inner surface 60 of filler plate 48 surrounds and is substantially evenly spaced from the outer edges of flanges 28 and 28'. As shown in FIGS. 3 and 5, space 63, which is located between inner surface 60 of filler plate 48 and the outer edges of flanges 28 and 28', is provided so that duct 10 and supporting assembly 16 can conjointly shift orbitally about the longitudinal axis of duct 10 within the confines of space 63. Filler plate 48 is substantially twice the thickness of flange 28 and maintains capture plate 46 at a spaced distance from the partition. Inner surface 64 of capture plate 46 is substantially evenly spaced, as is most clearly illustrated in FIG. 3, from tubular portion 22' of sleeve assembly 20. The capture plate is held in place by mounting bolts 50 in an overlapping relationship with flanges 28 and 28' of the supporting assembly so that the supporting assembly may shift rotatively and orbitally about the duct's longitudinal axis. Capture plate 46 overlaps flanges 28 and 28', thereby restraining shifting of supporting apparatus 16 transversely to the face of partition 12. Mounting assembly 14 is so configured that when a rotative force is applied to duct 10, both duct 10 and supporting assembly 16 will rotate conjointly with respect to mounting assembly 14 before duct 10 will rotate separately from supporting assembly 16. Although FIG. 2 shows filler plate 48 secured in place between capture plate 46 and partition 12 by bolts 50, filler plate 48 could alternatively be secured to capture plate 46 by other means.

It is preferred to make the parts of the supporting and mounting assemblies of corrosion resistant steel (stainless steel); however, the parts may be made of any suitable material, and the material may be of any thickness desired.

While only one embodiment of the invention is illustrated herein, it is to be understood that this single embodiment is merely for the purpose of illustration. It is to be further understood that various changes in construction may be resorted to in the course of manufacture in order that the invention may be utilized to the best advantage according to circumstances which may arise without in any manner departing from the spirit and intention of the invention, which is to be limited only in accordance with the appended claims. And while there is stated a primary field of utility of the invention, it remains obvious that it may be employed in any other capacity wherein it may be found applicable.

I claim as my invention:

1. Apparatus for use with a partition subjectable to a transient pressure differential between opposite faces thereof to support an elongated member in position extending through an opening in the partition with its length generally perpendicular to the faces thereof, said apparatus comprising:

sleeve means for supporting said elongated member, said sleeve means having an interior contour conformable to the external contour of said member, and a flange projectable transversely from the exterior of said sleeve means a distance sufficient to overlap the edge of the opening on one face of said partition, said sleeve means being contactable with said elongated member with sufficient contact pressure to maintain an overpressure seal between said elongated member and said sleeve means, and a mounting assembly mountable by the partition adjacent to the opening for supporting said sleeve means such that said flange overlaps the edge of the opening to maintain an overpressure seal between said flange and said partition, said mounting assembly including means for confining and guiding said flange such that said sleeve means may shift conjointly with said elongated member about its longitudinal axis rotatively and orbitally, and permit said elongated member to shift lengthwise with respect to said sleeve means in a direction transverse to the faces of said partition, whereby said overpressure seals allow some leakage of gas from one side of said partition to the other side to slowly equalize pressures on opposite sides of said partition but will prevent an instantaneous pressure equalization.

2. The apparatus of claim 1 wherein said sleeve means include a tubular portion, said interior contour being formed therein and being conformable to the exterior contour of said elongated member, said flange projecting transversely from one end of said tubular portion for operative connection with said mounting means, whereby said overpressure seal between said flange and said partition is established.

3. The apparatus of claim 2 wherein said sleeve means further include lip means extending outwardly from the other end of said tubular portion for protecting said elongated member from damage resulting from lengthwise movement of said elongated member with respect to said sleeve means.

4. The apparatus of claim 1 wherein said sleeve means include an elongated gap extending the length thereof to allow expansion and contraction thereof.

5. The apparatus of claim 1 wherein said mounting assembly further includes:

a filler plate positionable adjacent said one face of said partition, having an inner surface adapted to surround said flange in substantially evenly spaced relation therefrom, and a capture plate disposed upon said filler plate in an overlapping relationship with said flange, said flange being positionable between said capture plate and said one face and confinable within said inner surface so as to guide said flange for said rotative and orbital shifting while retaining said flange against movement transverse to the faces of said partition.

6. Apparatus for use with a partition subjectable to transient pressure differentials between opposite faces thereof to support an elongated member in position extending through an opening in the partition, said apparatus comprising:

supporting means comprising a first sleeve means with a tubular portion having an interior contour conformable to the external contour of said elongated member and having a flange projecting transversely from one end of said first sleeve means and a second sleeve means with a tubular portion having an interior contour conformable to said external contour of said elongated member and having a flange projecting transversely from one end of said second sleeve means, said first sleeve means and said second sleeve means being positionable end-to-end with their flanges in abutting face-to-face relationship, the tubular portion of said second sleeve means extending through said opening with the flange thereof in overlapping relationship with the edge of said opening on one face of said partition, at least said second sleeve means being contactable with said elongated member with sufficient contact pressure to maintain an overpressure seal between said elongated member and said second sleeve means, and a mounting assembly mountable by the partition adjacent to the opening for supporting said supporting means such that said flanges overlap the edge of the opening on said one face to maintain an overpressure seal between said flanges and said partition, said mounting assembly including means for confining and guiding said flanges such that said supporting means may shift conjointly with said elongated member about its longitudinal axis rotatively and orbitally and permit said elongated member to shift with respect to said supporting means in a direction transverse to the faces of said partition, whereby said overpressure seals allow some leakage of gas from one side of said partition to the other side to slowly equalize pressures on opposite sides of said partition but will prevent an instantaneous pressure equalization.

7. The apparatus of claim 6 wherein said first and second sleeve means further include lip means extending outwardly from the other end of said tubular portion for protecting said elongated member from damage resulting from lengthwise movement of said elongated member with respect to said sleeve means.

8. The apparatus of claim 6 wherein said first and second sleeve means each include an elongated gap extending the length thereof to allow radial expansion and contraction thereof.

9. The apparatus of claim 8 wherein said flanges of said first and second sleeve means are provided with at least one hole and means for fastening said pair of flanges together in abutting face-to-face relationship to prevent said gaps in said sleeve means from aligning.

10. The apparatus of claim 6 wherein said mounting assembly further comprises:

a filler plate positionable adjacent said one face of said partition, having an inner surface adapted to surround said flanges in substantially evenly spaced relation therefrom, and a capture plate disposed upon said filler plate in an overlapping relationship with said flanges, said flanges being positionable between said capture plate and said one face of said partition and confinable within said inner surface so as to guide said flanges for said rotative and orbital shifting while retaining said flanges against movement transverse to the faces of said partition.

* * * * *